(12) United States Patent
Jung

(10) Patent No.: US 8,844,997 B2
(45) Date of Patent: Sep. 30, 2014

(54) DISPLAY SCREEN IN A VEHICLE INTERIOR

(75) Inventor: Rainer Jung, Nieder-Olm (DE)

(73) Assignee: GM Global Technology Operations LLC, Detroit, MI (US)

( * ) Notice: Subject to any disclaimer, the term of this patent is extended or adjusted under 35 U.S.C. 154(b) by 73 days.

(21) Appl. No.: 13/309,604

(22) Filed: Dec. 2, 2011

(65) Prior Publication Data

US 2012/0139280 A1 Jun. 7, 2012

(30) Foreign Application Priority Data

Dec. 3, 2010 (DE) .......................... 10 2010 053 344

(51) Int. Cl.
*B60R 7/06* (2006.01)
*B60R 7/04* (2006.01)
*B60K 35/00* (2006.01)

(52) U.S. Cl.
CPC ............. *B60R 7/04* (2013.01); *B60K 2350/203* (2013.01); *B60K 2350/106* (2013.01); *B60K 2350/405* (2013.01); *B60K 35/00* (2013.01)
USPC ..................................................... 296/37.12

(58) Field of Classification Search
USPC ........................... 296/37.12; 345/173, 87, 902
See application file for complete search history.

(56) References Cited

U.S. PATENT DOCUMENTS

| | | | | |
|---|---|---|---|---|
| 5,940,120 A * | 8/1999 | Frankhouse et al. | ............ | 348/61 |
| 6,012,785 A * | 1/2000 | Kawasaki | ...................... | 312/29 |
| 6,049,288 A * | 4/2000 | Kawasaki | .................. | 340/815.4 |
| 6,086,129 A * | 7/2000 | Gray | .............................. | 296/37.8 |
| 6,494,527 B1 * | 12/2002 | Bischoff | ....................... | 296/208 |
| 6,522,368 B1 * | 2/2003 | Tuccinardi et al. | ............ | 348/837 |
| 6,758,521 B2 * | 7/2004 | Imamura et al. | ........... | 297/217.3 |
| 6,926,329 B2 | 8/2005 | Neumann et al. | | |
| 7,021,691 B1 * | 4/2006 | Schmidt et al. | ................. | 296/70 |
| 7,084,932 B1 * | 8/2006 | Mathias et al. | ................ | 348/837 |
| 7,192,072 B2 * | 3/2007 | Schmidt et al. | ............ | 296/37.12 |
| 7,201,420 B2 * | 4/2007 | Vican | ......................... | 296/37.12 |
| 7,280,166 B2 * | 10/2007 | Nagata et al. | ................. | 348/837 |
| 7,379,125 B2 * | 5/2008 | Chang | .......................... | 348/837 |
| 7,425,891 B2 * | 9/2008 | Colburn et al. | ............... | 340/438 |
| 7,440,275 B2 * | 10/2008 | Schedivy | ................. | 361/679.41 |
| 7,474,204 B2 * | 1/2009 | Songwe, Jr. | ................. | 340/461 |
| 7,575,265 B2 * | 8/2009 | Vitito | .......................... | 296/37.8 |
| 7,650,230 B1 * | 1/2010 | Laverick et al. | .............. | 701/491 |
| 7,653,345 B2 * | 1/2010 | Schedivy | ..................... | 455/3.06 |
| 7,802,835 B2 * | 9/2010 | Vitito | .......................... | 296/37.8 |
| 7,823,952 B2 * | 11/2010 | Utsugi et al. | ................... | 296/70 |

(Continued)

FOREIGN PATENT DOCUMENTS

| | | |
|---|---|---|
| DE | 10133896 A1 | 1/2003 |
| DE | 10159919 A1 | 6/2003 |

(Continued)

OTHER PUBLICATIONS

UK IPO, British Search Report for Application No. 1120643.0, dated Mar. 9, 2012.

*Primary Examiner* — Kiran B Patel
(74) *Attorney, Agent, or Firm* — Ingrassia Fisher & Lorenz, P.C.

(57) ABSTRACT

A display screen in a panel in a vehicle interior, in particular a dashboard or central console, is mounted so it is pivotable in the panel and can be switched over from a display mode into an illumination mode.

15 Claims, 1 Drawing Sheet

(56) References Cited

U.S. PATENT DOCUMENTS

| | | | |
|---|---|---|---|
| 7,871,115 B2* | 1/2011 | Vitito et al. | 296/37.8 |
| 7,894,003 B2* | 2/2011 | Chang | 348/837 |
| 8,142,030 B2* | 3/2012 | Bowden et al. | 353/82 |
| 8,267,472 B2* | 9/2012 | Large et al. | 297/217.3 |
| 2001/0042990 A1* | 11/2001 | Ito et al. | 296/70 |
| 2002/0140632 A1* | 10/2002 | Shah | 345/5 |
| 2004/0237111 A1* | 11/2004 | Iraclianos et al. | 725/75 |
| 2005/0224689 A1* | 10/2005 | Tanaka et al. | 248/694 |
| 2006/0075934 A1* | 4/2006 | Ram | 108/44 |
| 2006/0128303 A1* | 6/2006 | Schedivy | 455/3.06 |
| 2010/0231547 A1 | 9/2010 | Pryor | |
| 2011/0121599 A1* | 5/2011 | Goupil et al. | 296/37.12 |
| 2012/0280530 A1* | 11/2012 | Nemoto | 296/37.12 |
| 2013/0093205 A1* | 4/2013 | Stephan | 296/37.12 |

FOREIGN PATENT DOCUMENTS

| | | |
|---|---|---|
| DE | 202007001799 U1 | 3/2008 |
| DE | 10393556 B4 | 1/2009 |
| EP | 0675019 A1 | 10/1995 |
| GB | 2276059 A | 9/1994 |
| JP | 11321384 A | 11/1999 |
| JP | 2006192972 A | 7/2006 |
| JP | 2008134423 A | 6/2008 |
| WO | 2007075461 A2 | 7/2007 |

\* cited by examiner

DISPLAY SCREEN IN A VEHICLE INTERIOR

CROSS-REFERENCE TO RELATED APPLICATION

This application claims priority to German Patent Application No. 102010053344.0, filed Dec. 3, 2010, which is incorporated herein by reference in its entirety.

TECHNICAL AREA

The technical field relates to a display screen in a panel in a vehicle interior.

BACKGROUND

In modern motor vehicles, a display screen is frequently provided in the area of the dashboard, which is used as an output interface of an onboard computer for displaying manifold environmental and operating variables, such as the outside temperature, the fuel consumption, etc. Additionally or alternatively, such a display screen is frequently also used as an output device of a navigation system, automobile radio, etc. If a touch sensitive display screen (touch screen) is used or if separate operating elements are assigned to a display which is not touch sensitive per se, such a display screen can also be provided as an input interface for the onboard computer, the navigation system, or the automobile radio. Display screens are also used in the rear area of the vehicle interior, where they are primarily part of a multimedia entertainment system.

DE 101 59 919 B4 discloses a panel part of a vehicle interior, in particular a dashboard or central console, having a display screen, which can be folded from a non-usage position into a usage position, and at least one guide element, which is linked on one side to the panel part and on the other side to the display screen. The display screen can be folded out of this panel part into its usage position.

In view of the foregoing, objects, desirable features and characteristics will become apparent from the subsequent summary and detailed description, and the appended claims, taken in conjunction with the accompanying drawings and this background.

SUMMARY

A display screen is to be designed in such a manner that it also receives a further function, which is used for the convenience of the vehicle occupants, in addition to its actual display function. A display screen in a panel in a vehicle interior, in particular a dashboard or central console, is mounted so it is pivotable in the panel and can be switched over from a display mode into an illumination mode.

If the display screen is in the display mode, it fulfills its actual function, specifically; it is used to display information for the vehicle occupants. After the display screen has been switched over into the illumination mode, it fulfills a comfort function as a type of illuminant for illuminating the vehicle interior, its light radiation being able to be guided in a specific direction by appropriate pivoting, in order to look for things in a targeted manner in particular during travel, for example, in a tray in the area of the central console, without blinding or distracting the driver, as typically occurs when a known vehicle interior light is switched on. In the illumination mode, the display screen can still display information for the vehicle occupants; however, a greater light intensity or brightness of the display is preferable for the illumination. Of course, the display screen can also be operated in a specific color, optionally at maximum brightness, in the illumination mode.

A switch 12 is expediently provided for switching over the display screen between the display mode and the illumination mode. In one design, the switch 12 is either implemented as a location sensor or comprises an actuating element, which is to be actuated upon pivoting of the display screen or by a vehicle occupant. The switch 12 can be arranged in an area which is well reachable by both the driver and also a passenger of the motor vehicle, for example, in particular in a central console or in a middle area of the dashboard. Furthermore, it is alternatively possible to actuate the switch 12 upon pivoting of the display screen, preferably, for example, to switch over between the display mode and the illumination mode upon reaching a specific position of the display screen. A location sensor can detect a specific pivot position in a contactless manner, while if a mechanical switch is arranged, its actuating element can be placed appropriately.

To individualize the illumination by the display screen, the color of its display can preferably be switched over in the illumination mode, preferably to white, blue, red, yellow, or a mixed color. A white light appears particularly bright and is suitable for looking for objects, while light of other colors can be used as a type of ambient lighting, for example.

In order that the display screen can also be used as an input device, its display is advantageously implemented as a touch-screen, which is used to control functions of an onboard computer or a navigation system 20, to switch over between the display mode and the illumination mode, to select the color in the illumination mode, or the like. Its display is expediently implemented as an LCD, LED, or OLED.

According to a refinement, a hinge or a guide element 13 is active between the display screen and the panel, which positions the display screen in one end location as a closure flap for an opening of a storage compartment in the panel and, in another end location which releases the opening of the storage compartment, to illuminate the storage compartment and/or the panel or the vehicle interior enclosing the opening of the storage compartment. The display screen accordingly closes the storage compartment or releases it, the display screen preferably being switched into the display mode in the closure position. If the display screen is pivoted to open the storage compartment, it is switched over into the illumination mode, after which it is made easier for the vehicle occupants to look for objects inside the storage compartment or its surroundings.

In order that the illumination of both the interior of the storage compartment and also the surroundings of the storage compartment is ensured, the display screen is expediently arranged, in the end location which releases the opening of the storage compartment, in the area of a cover wall of the storage compartment, in particular both inside and also outside the storage compartment. For example, the display of the display screen pivoted on the cover wall is oriented in the direction of a floor of the motor vehicle.

In order to prevent unintentional pivoting of the display screen to open the storage compartment and the switch over into the illumination mode connected thereto, the display screen is removably locked in its location in relation to the panel in the end location which closes the opening of the storage compartment. The locking can be performed by a self-locking hinge or a latching by a closing mechanism, for example.

A motor vehicle comprises a display screen, which is mounted so it is pivotable in a panel part of a dashboard, a central console, or a vehicle seat and is used in one end location as a closure flap for an opening of the storage compartment in the panel and is arranged in the end location which releases the opening of the storage compartment in the area of a cover wall of the storage compartment, in particular both inside and also outside the storage compartment. Because of this arrangement, in addition to its actual display function, the display screen receives a further function, namely as a closure flap for the storage compartment, so that it lights both the interior of the storage compartment and also its surroundings when the storage compartment is open by its arrangement, which is used for the convenience of the vehicle occupants. For the illumination, it is not absolutely necessary to switch over the display screen into a special illumination mode. The display screen also emits a brightness which is sufficient for illuminating its immediate surroundings in the display mode.

The above-mentioned features and the features still to be explained hereafter are usable not only in the respective specified combination, but rather also in other combinations.

BRIEF DESCRIPTION OF THE DRAWINGS

The present invention will hereinafter be described in conjunction with the following drawing figures, wherein like numerals denote like elements, and.

DETAILED DESCRIPTION

Figure 1:
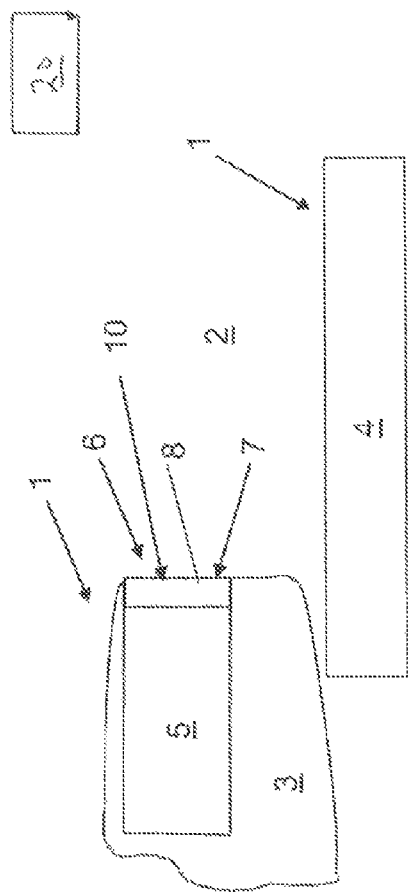
FIG. 1 shows a schematic sectional view through a panel in a vehicle interior having a display screen according to an embodiment.

The following detailed description is merely exemplary in nature and is not intended to limit application and uses. Furthermore, there is no intention to be bound by any theory presented in the preceding background or summary or the following detailed description.

The panel 1 in the vehicle interior 2 is a component, on the one hand, of a dashboard 3 and, on the other hand, of a central console 4. A storage compartment 5 is located in the dashboard 3, whose opening 6 is closed using the display screen 8, which is implemented as a closure flap 7. The display screen 8 is mounted so it is pivotable in the dashboard 3 and can be switched over from a display mode into an illumination mode.

The switchover can be performed as a function of the pivot position of the display screen 8. If the display screen 8 is in the end location which closes the opening 6 of the storage compartment 5 according to FIG. 1, it is removably locked in its location in relation to the panel and is in the display mode to display information for the vehicle occupants.

Figure 2:
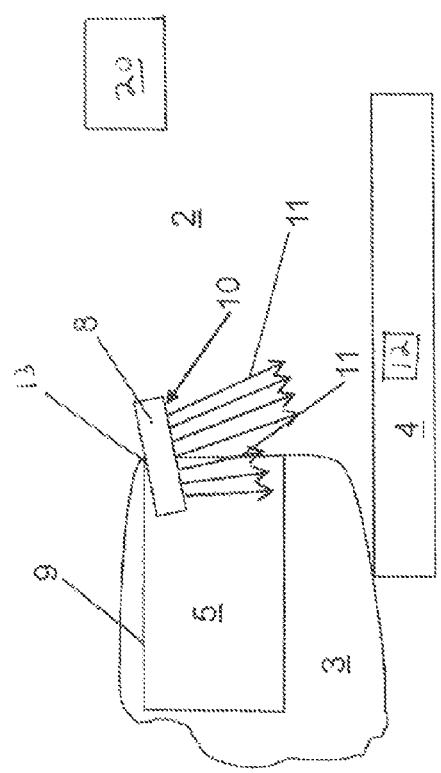
FIG. 2 shows a further schematic sectional view through the panel according to FIG. 1.

If the display screen 8 is pivoted into the end location according to FIG. 2, which releases the opening 6 of the storage compartment 5, it is located in the area of a cover wall 9 of the storage compartment 5 and is arranged both inside and also outside the storage compartment 5 in such a manner that its display 10 points in the direction of the central console 4. In this end location, which releases the opening 6 of the storage compartment 5, the display screen 8 is in the illumination mode and its light radiation, which is illustrated by arrows 11, illuminates both the storage compartment 5 and also its surroundings, in particular the central console 4, whereby a search for objects is simplified for vehicle occupants, without distracting the driver from traffic by this illumination.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An apparatus for a vehicle interior, comprising:
a panel in the vehicle interior;
a display screen pivotably mounted in the panel and configured to switch from a display mode into an illumination mode; and
a switch that is configured to switch the display screen from the display mode into the illumination mode, the switch actuating upon a pivoting of the display screen.

2. The apparatus according to claim 1, wherein the panel is a dashboard.

3. The apparatus according to claim 1, wherein the panel is a central console.

4. The display screen according to claim 1, wherein the switch is a location sensor.

5. The display screen according to claim 1, wherein the switch is an actuating element.

6. The display screen according to claim 1, wherein a display color is switchable over in the illumination mode to white.

7. The display screen according to claim 1, wherein a display color is switchable over in the illumination mode to blue.

8. The display screen according to claim 1, wherein a display color is switchable over in the illumination mode to red.

9. The display screen according to claim 1, wherein a display color is switchable over in the illumination mode to yellow.

10. The display screen according to claim 1, wherein a display color is switchable over in the illumination mode to a mixed color.

11. The display screen according to claim 1, wherein the display screen is a touchscreen configured for use in controlling functions of an onboard system to switch over between the display mode and the illumination mode.

12. The display screen according to claim 1, wherein the display screen is a LCD.

13. The display screen according to claim 1, wherein the display screen is an LED.

14. The display screen according to claim 1, wherein the display screen is an OLED.

15. The display screen according to claim 1, further comprising a guide element active between the display screen and the panel that is configured to position the display screen, in one end location, as a closure flap for an opening of a storage compartment in the panel and, in another end location, which releases the opening of the storage compartment, to provide a light.

* * * * *